Patented Aug. 2, 1949

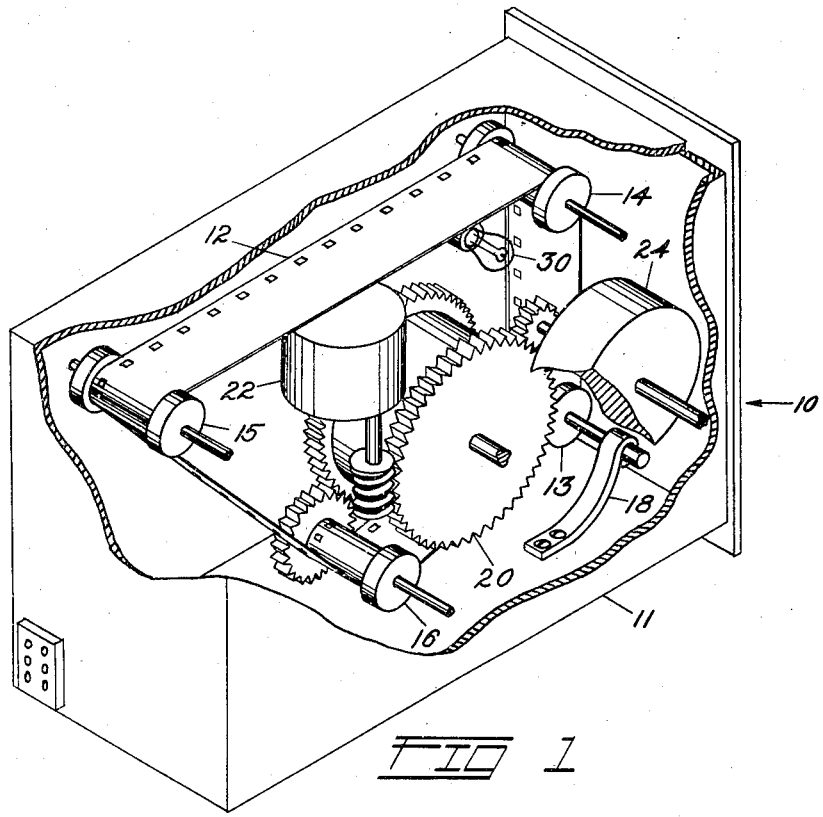
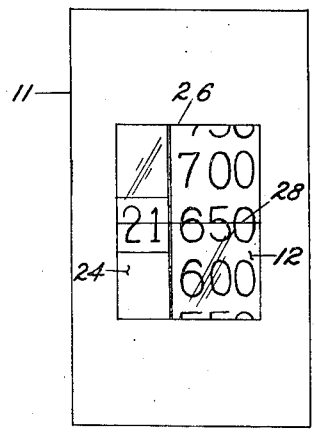

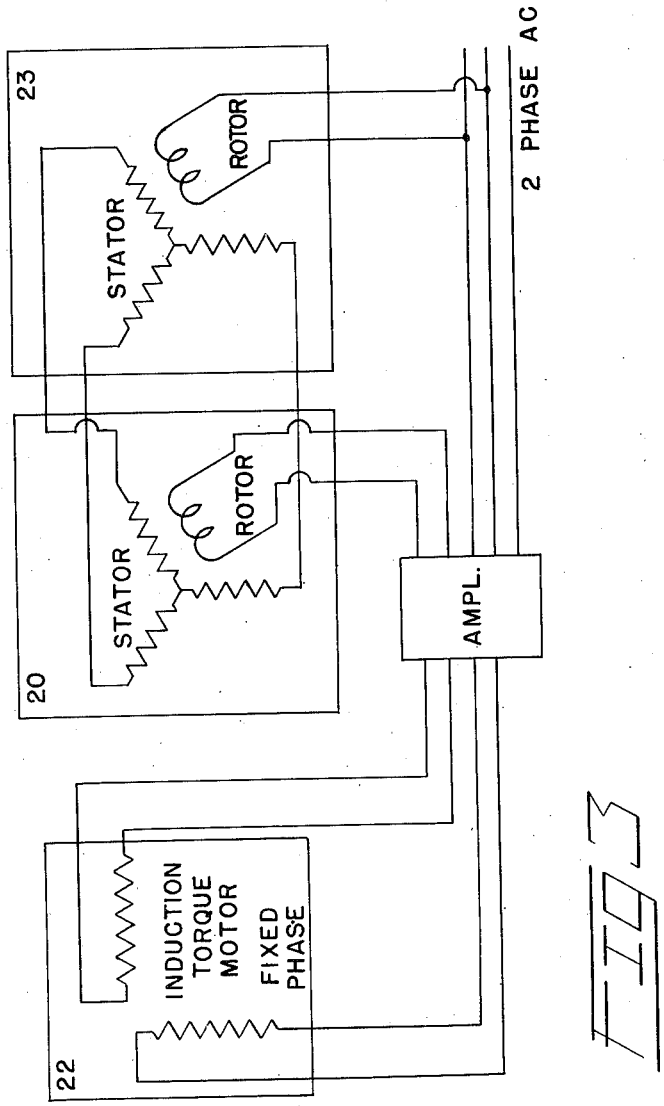

2,477,673

UNITED STATES PATENT OFFICE 2,477,673

SYNCHROMOTOR DRIVEN INDICATING INSTRUMENT

Charles Weisman, United States Navy

Application July 16, 1946, Serial No. 683,960

1 Claim. (Cl. 177—337)

(Granted under the act of March 3, 1883, as amended April 30, 1928; 370 O. G. 757)

This invention relates to indicating instruments and in particular to an instrument for remotely indicating numerical information derived from instruments that operate synchro generators.

An object of this invention is to provide an apparatus for remotely indicating numerical data in conjunction with instruments operating synchro generators.

Another object is to provide apparatus for indicating a wide range of numerical data.

Further objects and advantages of this invention, as well as its construction, arrangement and operation, will be apparent from the following description and claims in connection with the accompanying drawings, in which, Fig. 1 is an oblique view, looking from the rear, of one form of this invention, Fig. 2 is a front view of the apparatus shown in Fig. 1, and Fig. 3 is a diagram of the electrical circuit.

There is shown in Fig. 1 a remote indicating instrument, generally designated 10, to be used in conjunction with instruments that drive synchro generators. The instrument 10 comprises a case 11 and an endless tape 12 mounted on spools 13, 14, 15 and 16. Spool 13 maintains tape 12 taut by means of a spring 18. Along the edges of endless tape 12 are perforations that fit teeth on spool 16, which is driven by a servo mechanism, the synchro control transformer 20 and servo motor 22 which are included in case 11 and the synchro generator 23 which is shown only diagrammatically in Fig. 3. It is the reading of the synchro generator which is to be remotely indicated. A counter 24, also driven by the gears on control transformer 20, is used to supplement the reading of tape 12 to indicate the number of complete revolutions of the tape.

A window 26 (see Fig. 2) is provided in case 11 through which the reading of counter 24 and tape 12 may be read. A lubber line 28 is marked on window 26 for indicating the point at which the graduations on tape 12 are to be read. For example, in the position shown in Fig. 2 the reading of the indicator is 21,650. In application where such a wide range is not required, counter 24 may be eliminated.

Tape 12 may be made translucent and lights 30 (shown in Fig. 1) placed behind window 26 to illuminate tape 12 and counter 24 to adapt the indicator for use in the dark.

Some of the advantages of this type of indicator are:

1. In a space normally required for one standard 3⅛ inches aviation instrument, two of the type disclosed herein may be used.

2. The transmitting autosyn and its actuating instrument may be advantageously placed anywhere in the plane.

3. No needle need be followed in reading the indicators and tests have shown that the numbers may be read twice as fast as the dial-and-moving-needle instruments and with no ambiguity.

4. The movement of the tape may be coordinated with the changes in the altitude plane. Thus, when the device is used as an altimeter, the members increase whilst the tape moves downward, the plane climbing.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

In a positional control system wherein a synchro transmitter is adapted to be driven from a controlling object, and wherein a control transformer is electrically connected to said transmitter for generating a voltage corresponding to the deviation of the instantaneous position of said controlling object and the position of a controlled object, said system also including a motor adapted to be driven in response to said voltage and to position said controlled object to reduce said voltage to a minimum, the combination comprising means defining an enclosure having a window in a wall portion thereof, means mounting the control transformer and the motor within said enclosure, an endless tape having indicia thereon and mounted for movement within said enclosure adjacent said window, means interconnecting said motor and said endless tape for moving the latter in accordance with changes in position of said controlling object, whereby indications of the position of said controlling object are presented in said window, a counter cylinder having indicia on the cylindrical wall part thereof and mounted within said enclosure adjacent said window, and means for moving said counter cylinder in accordance with the movement of said tape, whereby to indicate the number of complete revolutions of said tape.

CHARLES WEISMAN.

(References on following page)

REFERENCES CITED

The following references are of record in the file of this patent:

UNITED STATES PATENTS

| Number | Name | Date |
|---|---|---|
| 1,150,054 | Missbach | Aug. 17, 1915 |
| 1,166,034 | Akemann | Dec. 28, 1915 |
| 1,197,212 | Kaminski | Sept. 5, 1916 |
| 1,527,768 | Anning | Feb. 24, 1925 |
| 1,554,915 | Hewlett et al. | Sept. 25, 1925 |
| 1,743,794 | Murphy | Jan. 14, 1930 |
| 2,074,066 | Wheeler et al. | Mar. 16, 1937 |
| 2,432,772 | Lear | Dec. 16, 1947 |

FOREIGN PATENTS

| Number | Country | Date |
|---|---|---|
| 385,652 | Germany | Nov. 26, 1923 |